United States Patent [19]

Griffin

[11] 4,324,709

[45] Apr. 13, 1982

[54] PROCESS FOR INCORPORATING A MODIFIER OF PROPERTIES OF A SHAPED SYNTHETIC POLYMER CONTAINING A BIODEGRADABLE SUBSTANCE THEREIN, AND THE PRODUCT OF THE PROCESS

[75] Inventor: Gerald J. L. Griffin, London, England

[73] Assignee: Coloroll Limited, London, England

[21] Appl. No.: 122,851

[22] Filed: Feb. 20, 1980

Related U.S. Application Data

[62] Division of Ser. No. 940,839, Sep. 8, 1978, Pat. No. 4,218,350.

[30] Foreign Application Priority Data

Sep. 16, 1977 [GB] United Kingdom ............... 38772/77

[51] Int. Cl.³ .................... C08L 23/06; C08L 23/12; C08L 3/02

[52] U.S. Cl. .................................. 523/210; 523/128; 523/52

[58] Field of Search ............ 260/17.4 ST, 9, 17.4 CL, 260/6, 8, 17.2, 17.3

[56] References Cited

U.S. PATENT DOCUMENTS

| | | | |
|---|---|---|---|
| 3,952,347 | 4/1976 | Comerford et al. | ............. 5/335 |
| 4,016,117 | 4/1977 | Griffin | ......... 260/17.4 ST |
| 4,125,495 | 11/1978 | Griffin | ......... 260/17.4 ST |

*Primary Examiner*—Earl A. Nielsen
*Attorney, Agent, or Firm*—Stevens, Davis, Miller & Mosher

[57] ABSTRACT

In the manufacture of products made of starch filled plastics the polymer and starch granules are mixed with a lubricant immediately prior to forming. A feedstock material in accordance with the invention comprises paticles of starch granules in admixture with a lubricant such as an oil or wax.

5 Claims, No Drawings

PROCESS FOR INCORPORATING A MODIFIER OF PROPERTIES OF A SHAPED SYNTHETIC POLYMER CONTAINING A BIODEGRADABLE SUBSTANCE THEREIN, AND THE PRODUCT OF THE PROCESS

This application is a division of application Ser. No. 940,839 filed Sept. 8, 1978, now U.S. Pat. No. 4,218,350 issued Aug. 19, 1980.

DESCRIPTION

This invention relates to compositions including plastics, i.e. synthetic polymers and organic biodegradable fillers particularly natural starch granules. Examples of such compositions are published in U.K. Patent Specifications Nos. 1,485,833 and 1,487,050.

The present invention is concerned with the incorporation of the filler part of the formulation. As the primary application of the invention is to compositions based on plastics and natural starch granule formulations we shall hereinafter, in the descriptive part of the specification, refer to the filler as starch. The use of other granular organic fillers such as lactose is not excluded.

We have proposed incorporating starch compositions by fluxing the plastic material and then adding the starch in a special purpose machine such as a mill having two rollers or an internal mixer. Because this fluxing and adding constitutes an extra operation before the plastics composition can be processed in a final conversion operation such as film extrusion, pipe extrusion, or injection moulding, it adds an extra processing cost to the overall operation and it is customary to minimise this extra cost by making the initial mixing at a high starch concentration referred to as a "masterbatch" which is subsequently diluted with unfilled polymer at the final conversion, thus reducing the tonnage passing through the masterbatching stage.

It has occasionally proved possible to add limited amounts, of the order of 1-2%, of starch directly to the polymer entering the final conversion operation, where the heat softening and mixing part of the machine takes the form of an extruder screw in a heated barrel, but this soon gives rise to mixing and dispersing problems as the concentration is raised and, in the case of natural starch, when the added concentration reaches 15-30% an extra complication is revealed in the form of dry friction between the relatively large starch granules.

It has now been discovered that this latter problem can be readily overcome by pre-mixing a small amount of a fluid lubricating substance, ultimately compatible with the polymer, with the starch whereupon at least 30% of starch can be directly blended, immediately prior to final conversion, with most thermoplastics. The lubricating substance which is plastic in state may be a liquid oil or a wax meltable into a liquid. The substance will hereinafter be referred to as a lubricant. It has further been observed that, when the dry friction is eliminated by the addition of a lubricant as described the extreme ease of dispersion of dry natural starch in molten polymers is developed to its full, this ease of dispersion being attributable to the virtual absence of very fine particles.

Further in accordance with the invention the starch is preformed with the lubricant into disparticles or pellets which particles or pellets are mixed with the plastics prior to final conversion. This is particularly advantageous when the starch granules are rendered hydrophobic in accordance with the teachings of U.K. Pat. No. 1,487,050. Such granules are difficult to handle and store in the raw state and the present invention makes it possible for the hydrophobic starch to be supplied to converters, extruders etc. as particles or pellets comprising a blend of starch and lubricant.

Further and in accordance with another aspect of the invention it has been found possible to use the starch as a vehicle for introducing into plastics compositions a variety of modifying substances such as fire retardants, smoke suppressants, fertilisers, crop nutrients such as nitrates and phosphates and insecticides and the like. It is necessary that these added substances should be soluble in a solvent which is not a solvent for starch grains, thus enabling the starch grains to be coated with a substantially uniform layer of the additive by blending together the additive solution at an appropriate concentration and the starch material followed by a drying stage to remove the solvent. This dry stage can conveniently be achieved by the well known process of spray drying or the operations of mixing and drying can be combined by introducing the additive solution into the starch which is being maintained in the form of a fluid bed by a stream of gas which is at a temperature appropriate to accomplish the drying action.

The following Examples illustrate the two aspects of the present invention:

EXAMPLE 1

Comparative tests comparing the extrusion characteristics of a starch/plastics blend with and without lubricant A dry blend of natural maize starch grains and polyethylene granules where the polyethylene had a melt flow index of 2 and a density of 0.918 was introduced into the hopper of an extrusion machine of screw diameter 45 mm and L:D ratio 20:1. The screw was a normal 3 section diminishing depth configuration designed for the extrusion of polyethylene, and the machine settings of temperature and speed were also appropriate to the extrusion of polyethylene. With a starch concentration of 25% by weight the starch friction produced much noise and the product was obviously imperfectly mixed and contained many particles of burnt and discoloured starch. When this operation was repeated using the techniques of the present invention but using a starch which had been cold pre-blended with a 10% of ethyl oleate, an oily material, calculated on the weight of the starch together with 4% of calcium stearate, another oily material calculated on the weight of the starch then the extrusion operation worked normally, producing a smooth and uniform product with no discolouration. The ethyl oleate is an autoxidisable material as described in our U.K. Patent Specifications Nos. 1,485,833 and 1,487,050. The starch granules may be untreated but preferably have the surfaces thereof modified (rendered hydrophobic) by reaction with a compound which readily reacts with hydroxyl groups to form an ester or an ether. This is in accordance with the teachings of U.S. Pat. No. 1,487,050.

EXAMPLE 2

400 grams of a lubricant, refined paraffin wax of melting range 50°-55° C. was fused in a water jacketed pan and maintained at a temperature about 10° C. above its melting point. 600 grams of corn starch dried to below 1% moisture content and preheated to 70° C. was added smoothly whilst agitating the mass with a slow speed stirrer. When all the starch was dispersed and no lumps or agglomerates remained the resulting fluid paste was poured into shallow metal trays and allowed to cool and solidify in the form of layers some 3 mm thick which were subsequently broken into fragments and sieved through a screen with 4 mm square apertures yielding uniform particles or pellets. These granules when mixed with low density polyethylene of density 0.912 and melt flow index 2 in the ratio of 8.33 parts by weight of starch concentrate to 91.67 parts by weight of polyethylene could be fed to the hopper of a conventional film blowing extrusion machine (a 45 mm screw diameter with L:D ratio of 20:1 and made by Samafor Limited, France) could be converted to plastic film of 50 micrometer thickness in which the starch could be seen to be uniformly dispersed and was present at a concentration of 5% by weight.

EXAMPLE 3

400 grams of refined paraffin wax of melting range 50°-55° C. was fused in a water jacketed kettle and maintained at a temperature of about 10° C. above its melting point. 600 grams of warm dry hydrophobic corn starch (prepared as described in British Patent Specification No. 1,487,050 was then mixed into the fluid wax by low speed stirring followed by 50 grams of iso-octyl oleate, 50 grams of calcium oxide of particle size 5 micrometers and below, and 200 grams of rutile titanium dioxide. The resulting fluid paste was refired by passing it through a Pascall & Co. 9"×3" triple roll mill with its rolls heated to 60° C., the ouput being received in shallow trays where it was allowed to cool and solidify in sheets about 3 mm thick before being broken into fragments and screened through a 4 mm aperture sieve. The sieved particles or pellets were blended with low density polyethylene of density 0.912 and MF12 in the ratio 11 parts by weight of granules to 89 parts by weight of polyethylene before extruding as described in Example 2 to give a white smooth film 50 micrometers thick and containing 6% starch, 2% pigment, 0.6% oleic ester autoxidant and 0.5% calcium oxide dessicant.

EXAMPLE 4

600 grams of dry hydrophobic starch prepared as described in British Pat. No. 1,487,050 was placed in a high speed fluidizing mixer made by Henschel AG and having a mixing chamber capacity of about 20 liters. In the mixer were also placed 50 grams of iso-octyl oleate, 50 grams of calcium oxide powder of particle size 5 micrometers and less, and 150 grams of roughly powdered paraffin wax of melting range 50°-55° C. The mixer was run at high speed until the wax fused, and then at lower speed allowing the temperature to fall to about 40° C. when the blend could be discharged as a warm dry powder which could be fed to a single punch tabletting machine by Manesty & Co. The product from the tabletting machine was in the form of small firm uniform tablets (pellet or granule) of dimensions similar to customary plastics granules. A blend of the starch concentrate granules with polyethene in such proportions as to give a starch concentration of 6% by weight in the final product was converted into plastic film as in the previous examples.

EXAMPLE 5

A warm blend of starch, iso-octyloleate, calcium oxide and wax dispersed in a high speed mixer and dicharged warm as described in Example 4 was transferred to a Manesty Co. 'Rotogran' oscillating bar granulating machine in which it was forced by moving steel bars through a coarse screen. The product was a coarse granular powder which could be blended with low density polyethylene and extruded into uniform film as described in Example 3.

In the above examples 2 to 5 paraffin wax could be replaced for example by a low molecular weight polyethylene wax. There is no limitation to low density polyethylene, successful films could be blown from High Density polyethylene. There is no limitation to film blowing, thick sections were extruded in other polyolefines and also starch filled polypropylene film was prepared by extrusion casting onto a chilled casting roller.

EXAMPLE 6

A plastics/starch formulation including a fire retardant

A slurry was prepared of corn starch in water by suspending 220 grams of undried maize starch in 1 liter of water. Sufficient ammonium molybdate was then dissolved in the suspension water to correspond to a final concentration of 12% of the weight of the starch. This slurry was then introduced into the spray system of a laboratory spray drying unit by compressed air at 4 kg/cm$^2$ and with the chamber air inlet temperature of 165° and outlet temperature of 65° C. The product recovered from the output cyclone was a free flow dry white powder which was used as a filler for plasticised PVC compositions containing 50 p.h.r. of D.O.P. plasticiser and 0.5 p.h.r. of lead stearate stabiliser, the modified starch concentration being adjusted to 30% by weight of the whole formulation. The mixing was accomplished on a steam heated 2-roll mill at 150° C. The product in the form of a sheet approximately 2.5 mm thick when compared with a similar formulation except for the ommission of the ammonium molybdate gave rise to a much lower generation of smoke in a combustion test. Again the starch granules are preferably rendered hydrophobic in accordance with the teachings of U.S. Pat. No. 1,487,050.

What is claimed is:

1. A method of manufacturing a synthetic polymer based composition including a synthetic polymer and starch granules, said method comprising the steps of suspending the starch granules in a solution of a substance which modifies the properties of the composition in a solvent which does not dissolve the starch granules, evaporating the solvent thereby leaving the granules coated with the modifying substance, and mixing the coated starch granules with the synthetic polymer.

2. In a process for incorporating biodegradable granules in a synthetic polymer composition, the improvement which comprises suspending biodegradable granules in a liquid non-solvent therefor which contains as a solute a substance which will modify the properties of said composition, evaporating non-solvent from the biodegradable granules until a coating of said modifying substance is deposited on the granules, and thereafter dispersing the resulting coated granules in said synthetic polymer composition.

3. The method of claim 1 wherein the said modifying substance is a fire retardant, smoke suppressant, fertilizer or a crop nutrient.

4. The method of claim 1 wherein the modifying substance is water soluble ammonium molybdate and the solvent is water.

5. A plastic based composition comprising a synthetic polymer and starch granules having absorbed therein or coated thereon a substance which modifies the properties of the composition, is soluble in a non-solvent for starch and is selected from the group consisting of a fire retardant, a smoke depressant, a fertilizer and a crop nutrient.

* * * * *